March 12, 1963  E. A. MEYER  3,080,629
MOULDING FASTENER
Filed Dec. 16, 1959  2 Sheets-Sheet 1

INVENTOR.
Engelbert A. Meyer
BY
L. D. Burch
ATTORNEY

March 12, 1963  E. A. MEYER  3,080,629
MOULDING FASTENER
Filed Dec. 16, 1959  2 Sheets-Sheet 2

INVENTOR.
Engelbert A. Meyer
BY
L. D. Burch
ATTORNEY

United States Patent Office 3,080,629
Patented Mar. 12, 1963

3,080,629
MOULDING FASTENER
Engelbert A. Meyer, Detroit, Mich., assignor to General Motors Corporation, Detroit, Mich., a corporation of Delaware
Filed Dec. 16, 1959, Ser. No. 859,975
2 Claims. (Cl. 24—73)

This invention relates to moulding fasteners and more particularly to a plastic fastener to secure the moulding strip on a supporting panel adapted to apply a force to the moulding strip outwardly from the panel.

In motor vehicle design, much stress is placed on the application of chrome moulding strips to the vehicle body in order to cover up body panel joints and to add aesthetic appeal to the product. In securing the moulding strips in their various positions on the vehicle body it is necessary to utilize some inexpensive form of fastening device which is simple to assemble and time saving in the assembly process. A further problem is that the design of the moulding strip is subject to change, due to styling changes and the like, and it is desirable to provide a fastener which is adaptable to such moulding changes.

In securing moulding strips to automobiles in the past it has been common to utilize metal fasteners of some configuration, which are received in the moulding strip. The assembly, comprising the moulding strip and a series of fasteners, is then snapped into place in the appropriate position on the automobile.

The supporting panels for the moulding strips are generally painted, prior to the installation of the moulding strip and fastener assembly, and the difficulty of chipping the paint around the receiving aperture, leaving bare metal exposed to the weather, becomes apparent. This provides a starting point for rust and corrosion, and leads an unsightly appearance of the vehicle, as well as a failure in the moulding strip fastening.

The device in which this invention is embodied comprises, generally, a plastic moulding fastener made of nylon, polyethelene, polypropylene, or any other suitable plastic material, having a body which is receivable in the moulding strip and a shank extending from the body and through the supporting panel aperture. A pair of legs, integral with the shank and extending outwardly therefrom, provides the necessary retention means for securing the fastener in the supporting panel. A plurality of arms extend from the body of the fastener and are adapted to engage the inner surfaces of the moulding strip and apply a force on the moulding strip in a direction away from the fastener body. This secures the fastener in the moulding strip prior to assembly in the supporting panel, providing a simple production assembly procedure.

Since the fastener is made of a plastic substance, the insertion of the fastener in the supporting panel does not chip or mar the paint surface about the aperture and provide a starting point for rusting of the metal. The plastic fastener is relatively simple to manufacture, being produced by a die casting process or some similar method, and provides a secure retention means for the chrome strip. As is the usual practice, the fastener is inserted in the moulding strip prior to attaching the strip to the vehicle supporting panel and is securely held in place during transportation of the moulding strip and fastener from one point to another in the manufacturing plant.

The fastener is more widely adapted ot various moulding strip cross-sectional configurations, since the arms extending from the body contact the inner surface of the strip and in effect clamp the strip to the fastener body.

These and other advantages will become more apparent from the following description and drawings in which.

Figure 1:
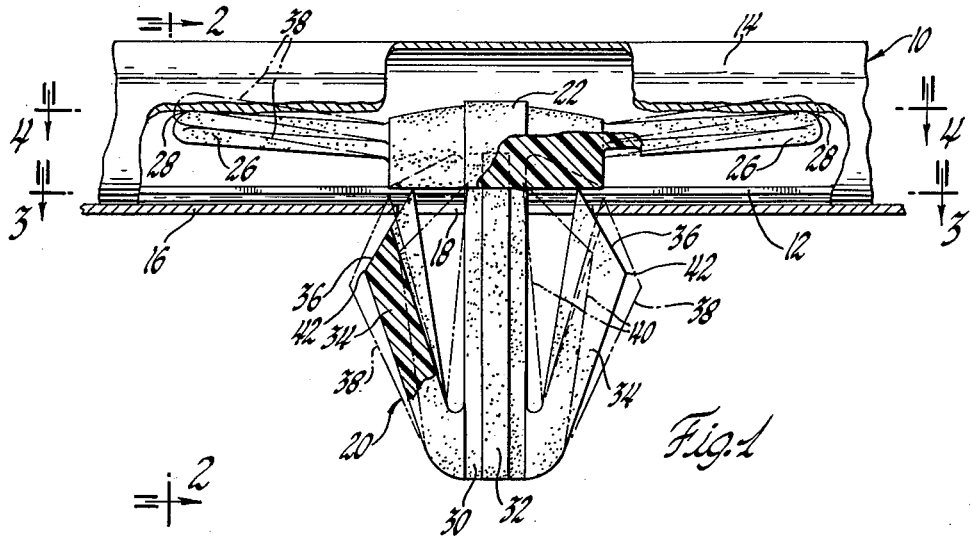
FIGURE 1 is an elevational view of a moulding strip installation with parts broken away and in section showing the fastening device secured in a moulding strip and in a supporting panel.
Figure 2:
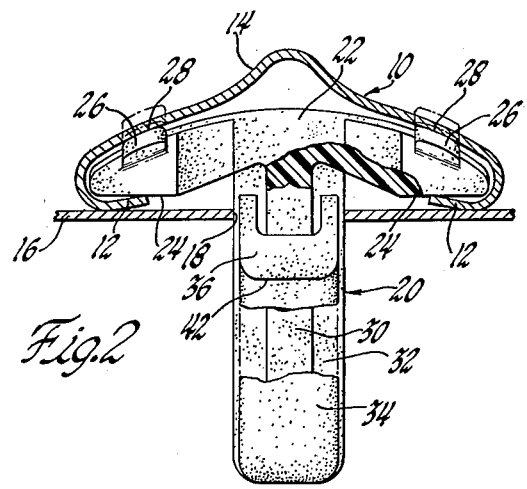
FIGURE 2 is a cross-sectional view of the installation illustrated in FIGURE 1 taken substantially along the line 2—2 of FIGURE 1 and looking in the direction of the arrows.
Figure 3:
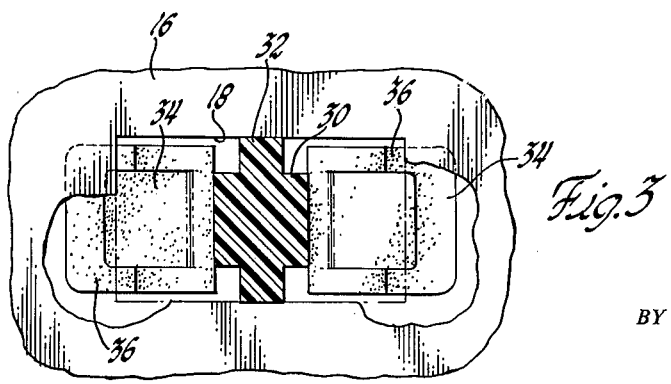
FIGURE 3 is a cross-sectional view of the installation illustrated in FIGURE 1 taken substantially along the line 3—3 of FIGURE 1 and looking in the direction of the arrows.
Figure 4:
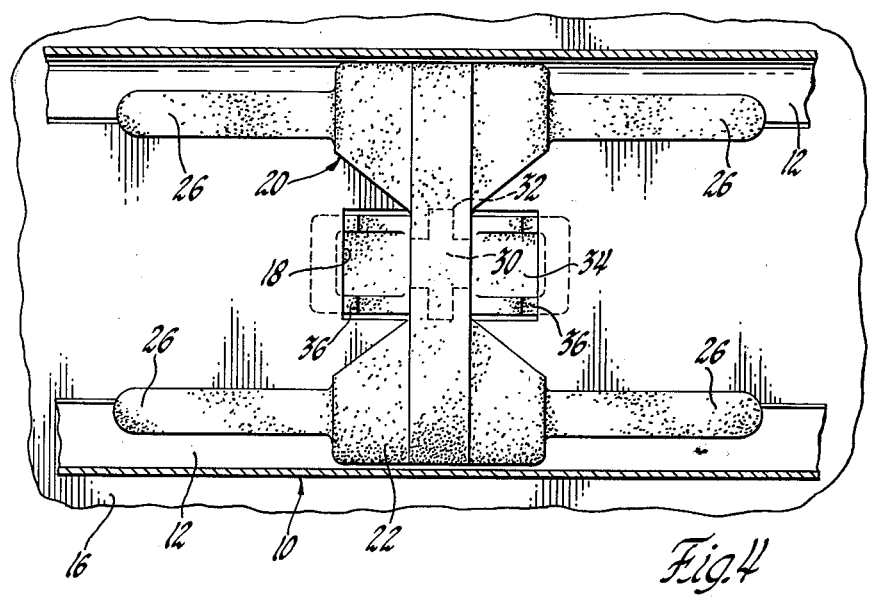
FIGURE 4 is a plan view of the installation illustrated in FIGURE 1 with parts broken away and in section and taken substantially along the line 4—4 of FIGURE 1.
Figure 5:
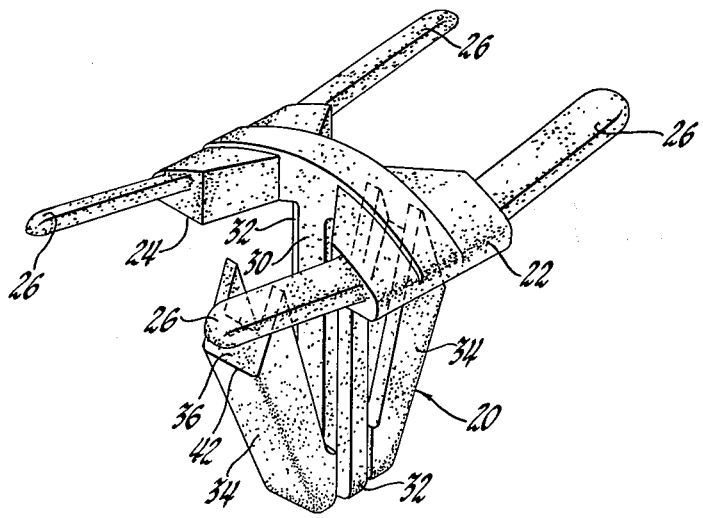
FIGURE 5 is a perspective view of the fastener device utilized in the installation of FIGURE 1.

Referring more particularly to the drawings, FIGURES 1 through 4 illustrate the installation of the chrome moulding strip to the supporting panel. The moulding strip, illustrated generally by the numeral 10, is generally U-shaped in cross section and has inturned flanges 12 extending inwardly thereof at the free edges. The main portion 14 of the moulding strip covers a panel joint, or is simply designed to cooperate with the styling of the motor vehicle.

A supporting panel 16, which may be any motor vehicle panel, such as a door, rear quarter panel, or the like, has a rectangular aperture 18 formed therein, as well as similar apertures at suitable intervals along the length thereof. The fastener device, illustrated generally by the numeral 20, secures the moulding strip 10 to the supporting panel 16 and it is to be understood that in securing the moulding strip a plurality of such fasteners 20 would be utilized at spaced intervals along the length thereof.

The fastener 20 includes a body portion 22 which extends crosswise of the moulding strip 10 and has flat surfaces 24 formed on the underside thereof to engage the inturned flanges 12 of the moulding strip 10.

A plurality of arms 26 extend outwardly from the body 22 and lengthwise of the moulding strip 10. The arms 26 are integrally formed from the body 22 and extend angularly upwardly, as illustrated in FIGURE 1. The ends of the arms 26 are adapted to engage the underside of the main portion 14 of the chrome strip 10, as illustrated at 28 in FIGURE 2, and are resilient to a sufficient degree to apply a force to the main portion 14 of the moulding strip 10 in a direction away from the body 22 of the fastener 20. This, in effect, clamps the moulding strip 10 to the body 22 to permit the fastener 20 to be retained in the moulding strip during transportation from one point to another.

Extending downwardly from the body 22 and through the aperture 18 and the supporting panel 16 is a shank 30 which is integrally formed from the body 22. The shank 30 may be rectangular in cross section, cylindrical in cross section, or may have any other cross-sectional configuration which provides an economical and simple method of manufacture. A pair of ribs 32 are provided at opposite sides of the shank 30, serving a dual purpose. The ribs serve to locate the shank 30 in a lateral direction in the opening 18, and at the same time provide added strength to the shank 30.

In order to retain the fastener 20 in the supporting panel 16, a pair of legs 34 extend from the lower end of the shank 30 and are integrally formed therefrom. The legs 34 extend along the shank 30 and define an acute angle with respect thereto, the legs being displaced at a greater distance from the upper end of the shank 30 than from the lower end. The legs 34 are resilient, to a sufficient degree to permit the shank and legs to pass through the supporting panel 16, and then bias themselves outwardly. Inclined surfaces 36, formed on the upper ends of the legs 34, engage the edges of the aperture 18 at a suitable point therealong to secure the fastener in the panel 16.

It is to be noted that the inclined surfaces 36 formed on the ends of the legs 34 engage the inner corner of the aperture 18 in the supporting panel 16 and, since the material of the fastener 20 is softer than the material of the supporting panel, the edge of the panel may bite into the inclined surface and, in combination with the angle of incline, prevent the legs from closing inwardly, by riding up along the inclined surfaces in response to a pull from above, and allowing the fastener to pull out of the aperture 18.

Referring to FIGURE 1, the free position of the fastener, 20, that is, the position assumed by the various parts prior to assembly in the moulding strip 10 and supporting panel 16, is indicated by the dashed and dotted lines bearing the numeral 38. In this position it may be seen that the legs 34 define a greater angle with the shank 30, such that when installed there is a force in an outward direction on the edges of the aperture 18 in the supporting panel 16. Similarly, with the arms 26 in the free position, the arms extend at a greater angle with respect to the horizontal from the body 22 so that when installed in the moulding strip a suitable force is applied against the inner surface of the moulding strip 10.

The position assumed by the legs 34 of the fastener 20, upon insertion of the fastener in the supporting panel 16, is shown by dashed and dotted lines bearing the numeral 40. It may be seen in viewing FIGURE 1 that the legs are closed to as near the shank as necessary to permit passage through the aperture 18, and remain closed until such time as the corners 42, defined by the outside surface of the legs and the inclined surfaces 36, pass through the aperture 18. At that time the inclined surfaces ride along the corner of the aperture 18 as the fastener is advanced through the supporting panel 16, until the installation is complete. The inclined surfaces then secure the fastener in the supporting panel as previously described, and the resiliency of the legs causes an outward force against the supporting panel to prevent removal of the installation.

Thus, it may be seen that a fastener is provided which securely retains a moulding strip on a supporting panel and overcomes the difficulties of rust and corrosion due to paint chipping and the like. It is further to be noted that the above-described fastener is adaptable to a wide variety of moulding strip cross-sectional configurations, due to the resiliency and length of the outwardly biasing arms.

What is claimed:

1. A plastic fastener for securing a generally U-shaped moulding strip having inturned flanges to a supporting panel having an aperture therethrough, said fastener comprising a body member receivable in said moulding strip transversely thereof, said body member including end portions having flat surfaces formed on the underside thereof to engage said inturned flanges, a pair of arms formed integrally with said end portions and extending angularly upwardly and adapted to engage the inner surface of said moulding strip at points spaced longitudinal of said strip, the points of contact of said body member end portions and their corresponding arms with said moulding strip being arranged to lie in planes that are substantially normal to the flat surfaces of said end portions of said body member, a shank depending from said body member and receivable through said aperture in said supporting panel, and a pair of legs integral with said shank at the lower end thereof and extending upwardly therefrom towards said supporting panel, each of said legs defining an acute angle with said shank in their free and installed positions, said legs terminating in inclined surfaces adapted to engage the edges of said aperture to clamp said body portion and said flanges of said moulding strip against said panel.

2. A plastic fastener as defined in claim 1 and further including a pair of strengthening ribs extending lengthwise of said shank and on opposite sides thereof to impart rigidity to said shank.

References Cited in the file of this patent
UNITED STATES PATENTS

| | | |
|---|---|---|
| 2,217,781 | Wiley | Oct. 15, 1940 |
| 2,246,720 | Churchill | June 24, 1941 |
| 2,521,354 | Flora | Sept. 5, 1950 |
| 2,618,824 | Poupitch | Nov. 25, 1952 |
| 2,698,979 | Flora | Jan. 11, 1955 |
| 2,863,195 | Elms | Dec. 9, 1958 |
| 2,885,754 | Munse | May 12, 1959 |

FOREIGN PATENTS

| | | |
|---|---|---|
| 1,176,696 | France | Nov. 24, 1958 |